Feb. 3, 1970    F. G. A. STENBERG    3,492,923
DEVICE FOR MAKING PACKINGS IN THE SHAPE OF TRAYS
Filed Dec. 8, 1967    5 Sheets-Sheet 1
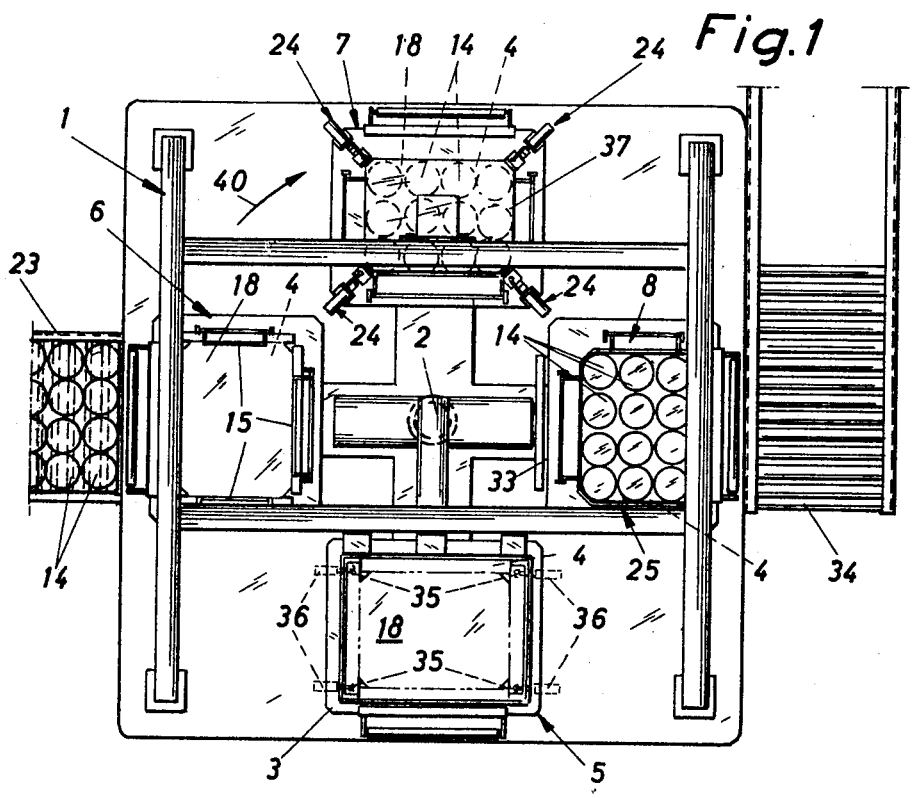
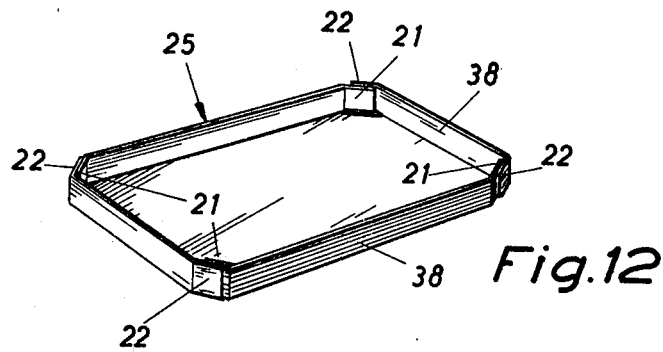
FOLKE GUSTAV ADOLF STENBERG
INVENTOR
BY Wenderoth, Lind &
Ponack. Attorneys Feb. 3, 1970     F. G. A. STENBERG     3,492,923
DEVICE FOR MAKING PACKINGS IN THE SHAPE OF TRAYS
Filed Dec. 8, 1967                              5 Sheets-Sheet 2
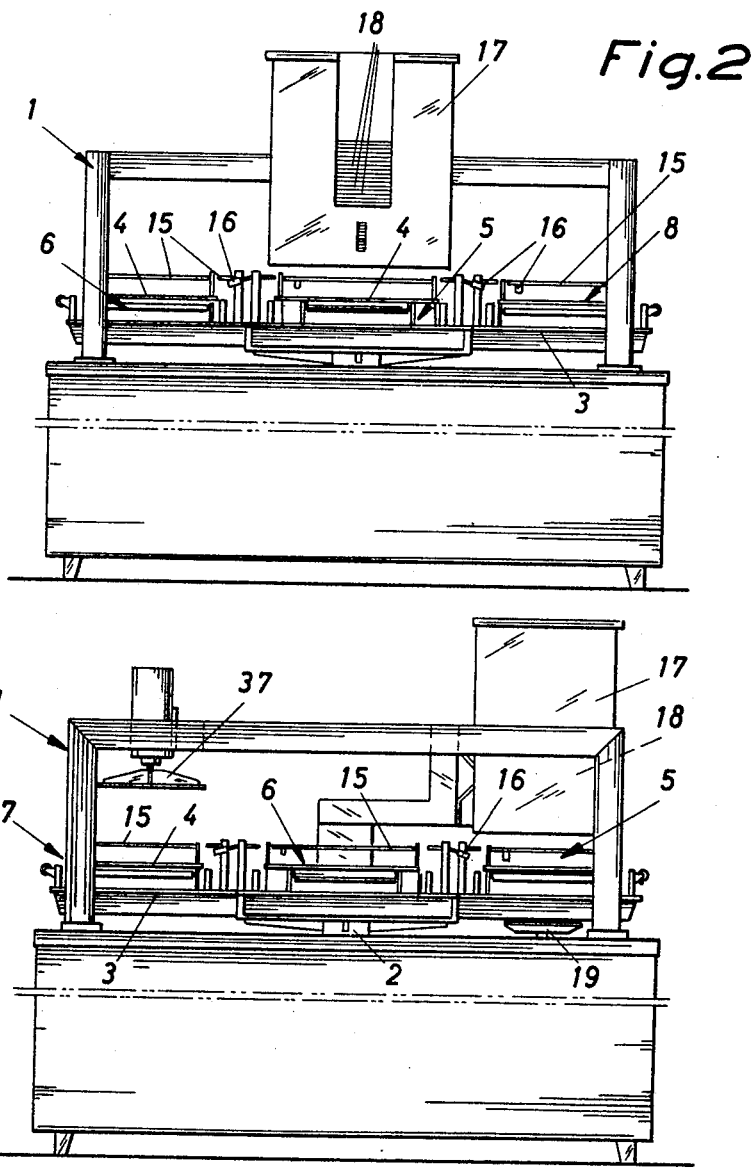
FOLKE GUSTAV ADOLF STENBERG
INVENTOR Feb. 3, 1970    F. G. A. STENBERG    3,492,923
DEVICE FOR MAKING PACKINGS IN THE SHAPE OF TRAYS
Filed Dec. 8, 1967    5 Sheets-Sheet 3
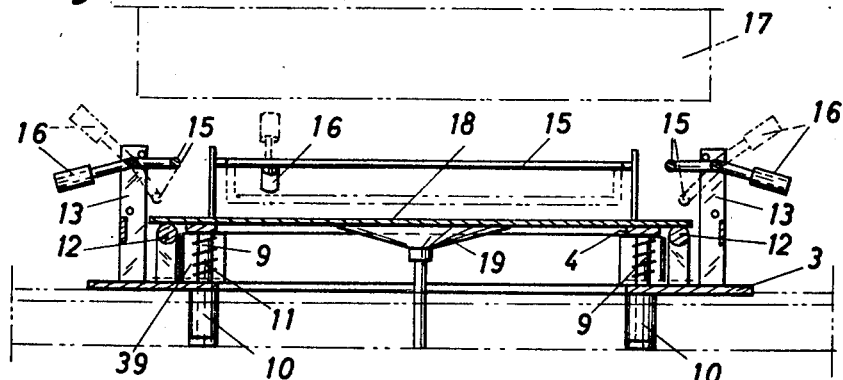
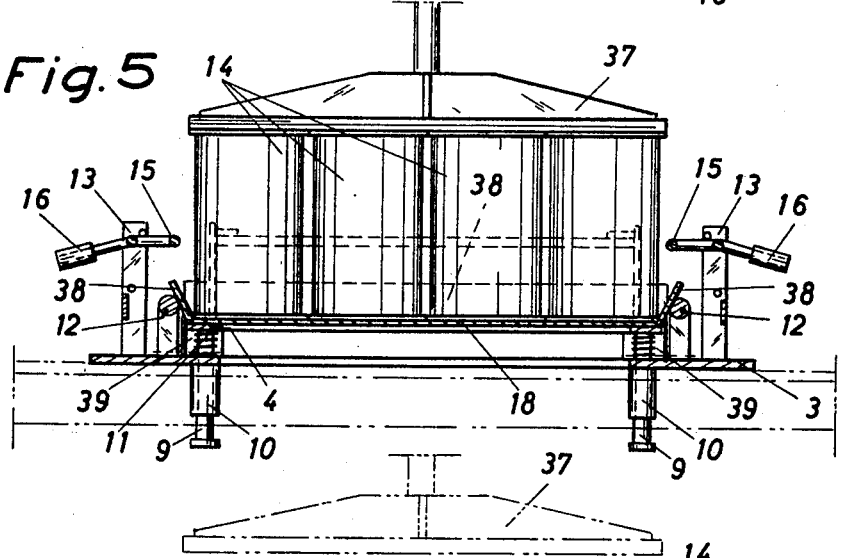
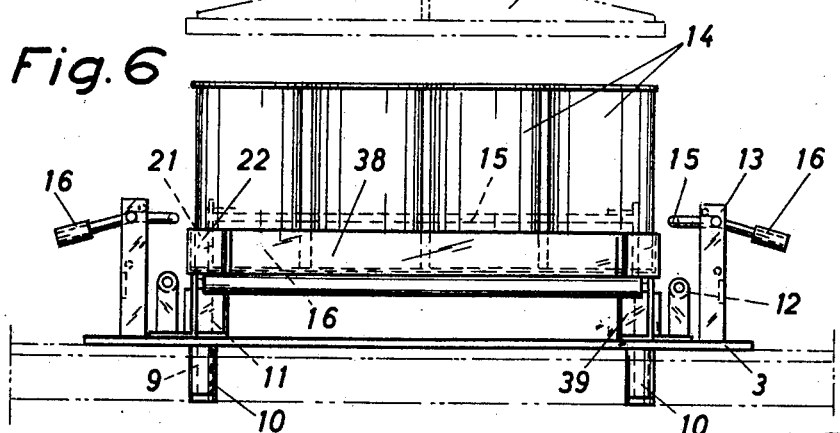
INVENTOR
FOLKE GUSTAV ADOLF STENBERG Feb. 3, 1970   F. G. A. STENBERG   3,492,923
DEVICE FOR MAKING PACKINGS IN THE SHAPE OF TRAYS
Filed Dec. 8, 1967   5 Sheets-Sheet 4
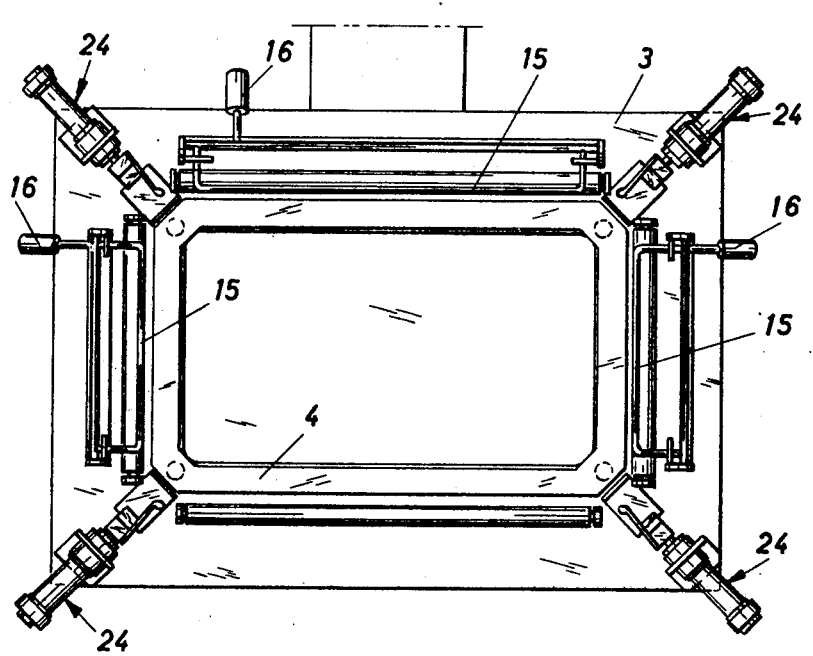
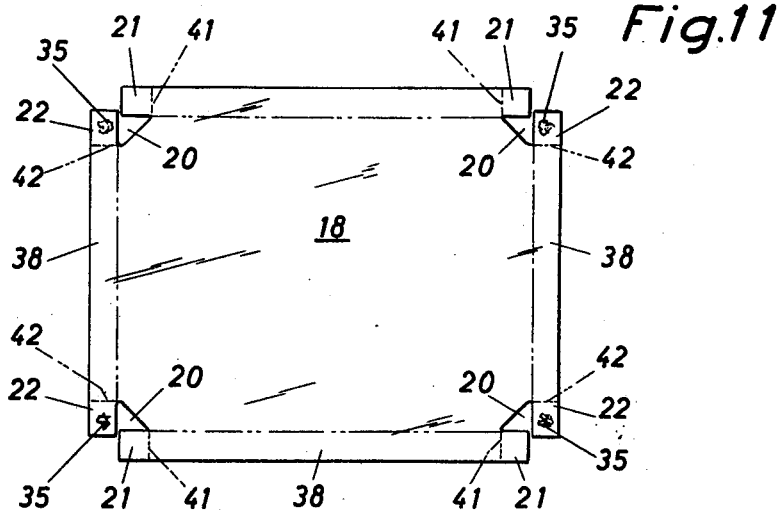
INVENTOR.
FOLKE GUSTAV ADOLF STENBERG
BY Wendroth, Lind &
Ponack. Attorneys Feb. 3, 1970  F. G. A. STENBERG  3,492,923
DEVICE FOR MAKING PACKINGS IN THE SHAPE OF TRAYS
Filed Dec. 8, 1967  5 Sheets-Sheet 5

FOLKE GUSTAV ADOLF STENBERG
INVENTOR

BY Wenderoth, Lind &
Ponack
Attorneys

United States Patent Office 3,492,923
Patented Feb. 3, 1970

3,492,923
DEVICE FOR MAKING PACKINGS IN
THE SHAPE OF TRAYS
Folke Gustav Adolf Stenberg, Kungalv, Sweden, assignor to AB Iwema Goteborg, Sweden, a corporation of Sweden
Filed Dec. 8, 1967, Ser. No. 689,195
Claims priority, application Sweden, Dec. 27, 1966, 17,725/66
Int. Cl. B31b 1/48, 3/60
U.S. Cl. 93—51                3 Claims

ABSTRACT OF THE DISCLOSURE

The present invention relates to an apparatus for the manufacture of packings in the shape of trays with all around upwardly extending walls and having triangular apertures at their corners and, extending outside these apertures, end flaps of equal width and adapted to be interconnected after having been raised. Piston devices at the four corners fold the end flaps in overlapped relationship and interconnect by pressure the previously glue-spotted flaps.

---

Figure 8:
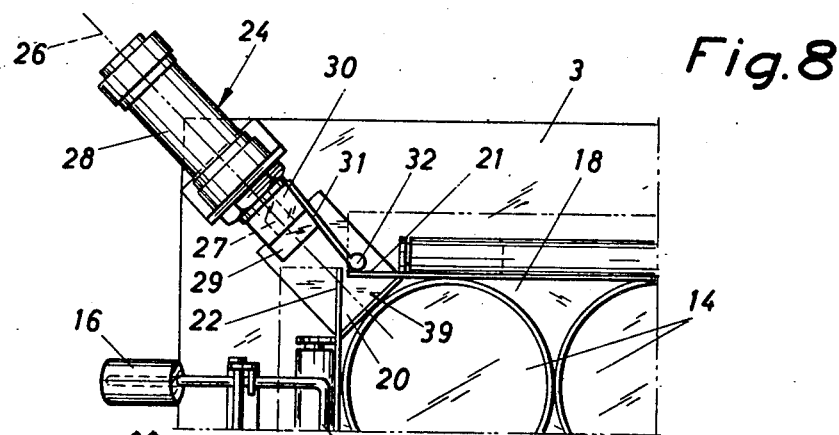

The present invention relates to an apparatus for the manufacture of packings in the shape of trays of flat blanks, comprising preferably pasteboard and being of polygonal shape. The blanks are provided with a triangular aperture at each corner and have end flaps of equal width extending outside the apertures. The apparatus comprises at least one frame for carrying a blank in such a way that the latter rests on the frame only at its edge portions and a vertically movable press plunger for pressing down the main portion of the blank together with the frame during folding up of the edge portions and the end flaps by means of its abutment against folding rods or the like. The main feature of the invention resides in stands arranged at either corner of the frame and serving as an abutment, in operation pistons arranged outside each corner and being essentially horizontally displaceable and adapted first to bend one end flap of the corner in question, after the folding up of the same, inwards over its stand or post and then to bend the other end flap, after its folding up, inwards over the first mentioned end flap and finally in a device for an interconnection of said two end flaps.

Several frames, preferably four, may be arranged on a rotating table and in such a way it is easy to construct and automatically operating apparatus for the manufacture of the trayformed packings with the goods to be wrapped arranged on the bottom of the tray and thereupon the latter may together with the goods if desired be wrapped in a shrink film or the like which is closed and sealed by being moved through a heated shrink tunnel.

The invention also comprises a method for the operation of the apparatus for the manufacture of packings in the shape of trays having all around a vertically upwards extending wall as set forth here above and this method is characterised thereby that the end flaps are brought to overlap each other and to be interconnected preferably by means of a binding agent at a pressing of one end flap against the other one whilst using fixed abutments at the corners of the blank.

The invention also relates to a polygonal blank preferably comprising pasteboard to be used in connection with the apparatus described in the aforegoing at the carrying out of the method also set forth in the aforegoing for the manufacture of tray-shaped packings. This blank is according to the invention at each corner provided with an aperture preferably of triangular shape and outside this aperture there extend two end flaps of uniform width, said flaps adapted to be folded perpendicularly up from the main portion of the blank and then to overlap each other and finally to be interconnected such that an obtuse corner is formed on the tray-shaped packing.

Figure 9:
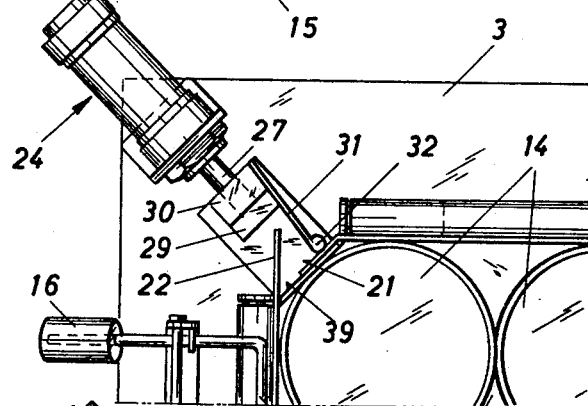
Figure 10:
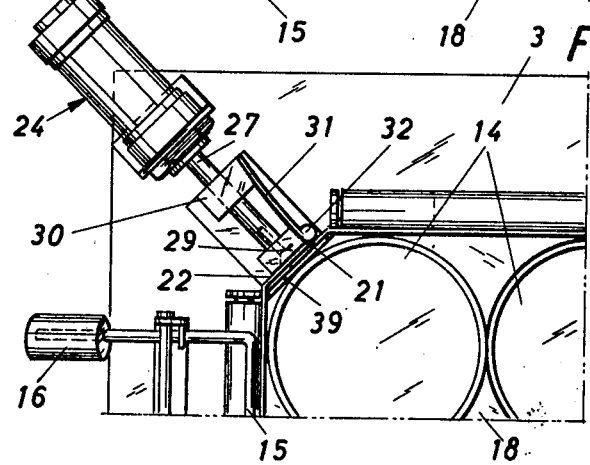

In the following the invention will be described more in detail with reference had to the accompanying, partly diagrammatical drawings. In the drawings:

FIG. 1 is a plan view of an apparatus according to the invention in the shape of a turn-table having four frames and four operation stations, FIG. 2 is a front view of the apparatus showing the first operation or treatment station, FIG. 3 is a side elevation of the apparatus showing the second operation station, FIG. 4 shows on an enlarged scale a vertical section through the frame in the first operation station with the blank in starting position, FIG. 5 shows a similar section through the second operation station during the folding up of the edge portions, FIG. 6 shows the frame in the same station retracted to the start position after having finally prepared a tray, FIG. 7 shows on an enlarged scale a plan view of one of the frames of the apparatus with devices for final preparing of the tray corners, FIGS. 8, 9, and 10 show on an even more enlarged scale plan views of one corner of the frame with the device for the preparing of the tray corners in three different operation positions, FIG. 11 is a plan view of a blank for the tray, and FIG. 12 shows on a perspective view obliquely from above a tray manufactured by means of the apparatus.

There is in the stand 1 (FIG. 1) of the apparatus vertically journalled a shaft 2 driven by means of a motor and carrying a turn-table 3 with four frames 4. The turn-table 3 is rotated step by step a quarter of a revolution between four different operation stations 5, 6, 7, and 8.

Each frame 4 is provided with four downwards directed pillars 9 each one of which is vertically displaceable in its guide sleeve 10 on the underside of the table 3 against the action of helical springs 11 inserted between the frame and the table. In level with the frame 4 which thus is vertically displaceable in relation to the table 3, there are on the same arranged horizontal folding rods 12 which extend along the outer borders of the frame. There are, on the table 3, also arranged stands 13 and there are between these stands 13 journalled guiding bows 15 for the adjustment of the goods to be packed, e.g. cans 14, and these bows 15 are normally, by means of counterweights 16, kept in the horizontal position shown in FIG. 4 with unbroken lines but may temporarily be swung down to the position shown with dash and dot lines.

In the operation station 5 there is above the frame 4 arranged a supply 17 for a pile of pasteboard blanks 18. In this station there are also vertically displaceable a suction device 19 (or a number of such suction devices) for feeding down one by one the pasteboard blanks 18 from the supply 17 down on the frame 4 situated below and the stands then serve for guiding the borders of the blank 18.

In FIG. 11 there is shown from above a rectangular pasteboard blank 18. This blank 18 is at its corners provided with triangular apertures 20 and outside the latter with end flaps 21, 22 of equal width one of which 22 in each pair being somewhat longer than the other one 21.

In front of the second operation station 6 in the row there is arranged a conveyor 23 for feeding the goods, i.e. cans 14 (FIGS. 8-10) to be packed and wrapped.

The third operation station 7 is provided with four devices 24 swingable from an outer non-operating position (not shown) to an operation position, said devices 24 adapted to prepare the corners on the tray 25 (FIG. 12) by a folding of the end flaps 21, 22 of the blank 18 as will be elucidated more in detail in connection with the following description of the function of the apparatus. Each folding device 24 comprises a hydraulically or pneumatically driven piston cylinder device 27, 28 arranged in the direction of the bisector 26 of each corner of the blank 18. The free end of the piston 27 is provided with a head 29 and there is on the piston 27 arranged a sleeve 30 which is displaceable against the effect of a certain friction and provided with a forwards directed arm 31, this arm extending with its free end 32 obliquely towards the bisector 26, The arm 31 is manufactured from a somewhat elastic material, preferably an elastic resin material.

The fourth operation station 8 is provided with a device 33 for the discharge of the finally prepared tray 25 with cans 14 thereon out on a conveyor 34 connected to this operation station 8.

The apparatus further comprises a device for applying a drip 35 or a small quantity of a suitable binding agent on each one of the longer end flaps 22 of the box blank 18. When the binding agent comprises a contact glue of the type latex this glue may be applied e.g. by means of spray jets 36 in the first operation station 5 when the blank 18 has been fed down onto the frame 4. If, however, a melt glue of the type Bostik is used this glue should be applied on the blank 18 in the third operation station 7 just before the preparing of the tray 25. This station is also provided with a vertically displaceable plunger 37 by means of which the cans 14 together with the blank 18 against the frame 4 can be pressed downwards for folding up the border portions 38 (FIG. 11) of the blank 18, the end flaps 21, 22 constituting enlongations of said portions 38. The section also comprises four stationary stands 39 (FIG. 5) taking the shape of vertically extending flat irons just outside each one of the four corners of the frame. The stands 39 which will be explained in the following serve as abutments at the preparing of the corners of the tray 25 are situated outside the corner apertures 20 in the blank 18.

The apparatus functions in the following manner. The lowermost pastboard blank 18 in the supply 17 is pulled by the suction device 19 down onto the frame 4 situated below, the guiding bows 15 thereby being temporarily swung away. The binding agent 35 is applied on the four end flaps 22. The turn-table 3 is then turned in the direction of the arrow 40 (FIG. 1) a quarter of a revolution to the station 6. In this station a number, e.g. twelve, cans 14 are fed onto the blank 18 and the bows 15 then serve as guides and thus they orientate the cans to the correct pattern on the blank 18. Again the table 3 is turned a quarter of a revolution. In the treatment station 7 the plunger 37 (FIG. 5) pushes vertically against the upper ends of the cans 14 and overcomes the force in the springs 11 such that the frame 4 with the blank 18 resting thereon are moved downwards whereat the border portions 38 of the blank by the stationary folding rods 12 are forced to be directed vertically upwards. In this position the pistons 27 with their sleeves 30 are displaced and the arms 31 on the sleeves 30 in the direction towards the centre of the blank 18 whereby the end flaps 21 are folded along the folding line 41 in question (FIG. 11) inwards against the stand 39 extending up through the aperture 20 (FIG. 9) and serving as an autment. The friction between the piston 27 and the sleeve 30 is adjusted in such a way that the end flap 21 is folded with sufficient force and pressed against the stand 39. At the continued displacement of the piston 27, the sleeve 30 remains with the arm 31 in its advanced position while the piston head 29 is brought to abutment against the lower end flap 22 and folds the same along the folding line 42 (FIG. 11) and presses against the outside of the end flap 21 (FIG. 10). Due to the binding agent 35 on the end flap 22, both flaps 21 and 22 are retained in folded position when the piston 27 with the sleeve 30 and the arm 31 is returned to the original position (FIG. 8). When the plunger 37 thereupon returns to the upper position (the original position), the springs 11 displace the frame 4 with the manufactured tray 25 and the cans 14 carried by the latter to the upper position above the table 3 and the table is then turned a quarter of a revolution. When it arrives to the fourth treatment station 8, the tray 25 with the cans 14 is displaced by means of the discharge device 33 out on the conveyor 34. The latter feeds the tray with the cans for further treatment, e.g. for being as a whole wrapped in a shrink foil which thereupon is heated in a shrink tunnel (not shown) and the packing is thereby closed.

Of course, the operations described in the aforegoing are carried out simultaneously in all the stations 5, 6, 7, 8 and the apparatus functions completely automatically.

The invention has been described in the aforegoing for purposes of illustration only and is not intended to be limited by this description or otherwise except as defined in the appended claims. Thus, the different portions of the apparatus may be constructively modified in many ways without departure from the inventive idea. Instead of making the folding devices 24 apt to be swung away in the third treatment station 7, it is possible to arrange these devices on the table 3 outside each one of the frames 4 and and thus have the folding device following the turn-table at the rotation of the same but to make them operative only when they have reached the third treatment station 7. The devices for feeding the turn-table 3 step by step and also the devices for displacing the suction device 19, the plunger 37 and the discharge device 33 are independent of the invention and have for this reason not been shown in detail in the drawings. The guiding bows 15 may be replaced by other means for guiding the cans 14. Also other goods than cans could be packed and wrapped by means of the apparatus. Instead of pasteboard the blank 18 may be manufactured from a resin suiting the purpose.

What I claim is:

1. An apparatus for the manufacture of packings in the shape of trays from flat polygonal blanks, preferably comprising pasteboard, said blanks having an aperture (20) at each corner, said apertures preferably being of triangular shape, said blank further provided with end flaps (21, 22) having equal width and extending outside said apertures (20), said apparatus being provided with at least one frame (4) for supporting one blank (18) on the frame only with its border portions (38) and a vertically displaceable press plunger (37) for pressing down the main portion of the blank (18) together with the frame (4) at a raising of the border portions (38) and the end flaps (21, 22) of the blank (18) by pressing them against folding rods (12), wherein the improvement comprises a stand (39) arranged at each corner of the frame (4) and serving as an abutment, and operation piston means (27) arranged outside each corner of the frame and being movable essentially in horizontal direction, said operation piston means (27) adapted first to fold the end flap (21) of its corner, after this end flap has been raised, in over its stand (39) and then to fold the other end flap (22), after the latter has been raised, over the first mentioned end flap (21), and said piston means interconnecting said two end flaps (21, 22).

2. An apparatus as claimed in claim 1, wherein the improvement comprises arranging the stands (39) stationarily in such a way that they at the lowering of the frame (4) will penetrate up through the same through the apertures (20) at the corners of the flat blank (18).

3. An apparatus as claimed in claim 1, wherein the improvement comprises an arm (31) on each one of the operation pistons (27) which arm is displaceable against the action of a friction means for being pressed against one end flap (21), said arm (31) adapted to be resiliently swung away by means of a head (29) on the piston (27) at the displacement of the latter essentially along the bisector (26) for the folding of the second end flap (22) and for the pressing of the same against the first mentioned end flap (21), said piston (27) adapted at its returning movement to return the folding arm (31) to its original position.

References Cited

UNITED STATES PATENTS

| | | | |
|---|---|---|---|
| 2,977,861 | 4/1961 | Gibb | 93—51 |
| 3,086,337 | 4/1963 | Engleson et al. | 53—222 XR |
| 3,277,799 | 10/1966 | Voltmer | 93—51 |

BERNARD STICKNEY, Primary Examiner

U.S. Cl. X.R.

53—209; 229—32